(12) United States Patent
Stefan et al.

(10) Patent No.: US 7,383,421 B2
(45) Date of Patent: Jun. 3, 2008

(54) CELLULAR ENGINE FOR A DATA PROCESSING SYSTEM

(75) Inventors: Gheorghe Stefan, Manchester, NH (US); Dan Tomescu, Richmond Hill (CA)

(73) Assignee: Brightscale, Inc., Sunnyvale, CA (US)

( * ) Notice: Subject to any disclaimer, the term of this patent is extended or adjusted under 35 U.S.C. 154(b) by 460 days.

(21) Appl. No.: 10/727,811

(22) Filed: Dec. 4, 2003

(65) Prior Publication Data

US 2004/0123071 A1    Jun. 24, 2004

Related U.S. Application Data

(60) Provisional application No. 60/431,154, filed on Dec. 5, 2002.

(51) Int. Cl.
*G06F 15/76* (2006.01)
(52) U.S. Cl. ......................................... 712/22; 711/101
(58) Field of Classification Search .................. 712/22; 711/101
See application file for complete search history.

(56) References Cited

U.S. PATENT DOCUMENTS

| | | | |
|---|---|---|---|
| 4,575,818 A | 3/1986 | Almy et al. | |
| 4,873,626 A * | 10/1989 | Gifford | ........................ 710/120 |
| 4,907,148 A | 3/1990 | Morton | |
| 4,983,958 A | 1/1991 | Carrick | |
| 5,122,984 A | 6/1992 | Strehler | |
| 5,150,430 A | 9/1992 | Chu | |
| 5,319,762 A | 6/1994 | Mayer | |
| 5,329,405 A | 7/1994 | Hou et al. | |
| 5,373,290 A | 12/1994 | Lempel et al. | |
| 5,440,753 A | 8/1995 | Hou et al. | |
| 5,448,733 A | 9/1995 | Satoh et al. | |
| 5,497,488 A | 3/1996 | Akizawa et al. | |
| 5,602,764 A | 2/1997 | Eskandari-Gharnin | |
| 5,640,582 A | 6/1997 | Hays et al. | |
| 5,758,176 A | 5/1998 | Agarwal | |
| 5,818,873 A | 10/1998 | Wall et al. | |
| 5,822,608 A * | 10/1998 | Dieffenderfer et al. | ....... 712/20 |

(Continued)

FOREIGN PATENT DOCUMENTS

JP          04-291659        10/1992

(Continued)

OTHER PUBLICATIONS

"The Connex Engine: An in-memory device for fast string operations"; Gheorghe Stefan and Dominique Thiebaut; Jan. 11, 2002.*

(Continued)

*Primary Examiner*—Alford Kindred
*Assistant Examiner*—Benjamin P. Geib
(74) *Attorney, Agent, or Firm*—Heaverstock & Owens LLP (57) ABSTRACT

A data processing system includes an associative memory device containing n-cells, each of the n-cells includes a processing circuit. A controller is utilized for issuing one of a plurality of instructions to the associative memory device, while a clock device is utilized for outputting a synchronizing clock signal comprised of a predetermined number of clock cycles per second. The clock device outputs the synchronizing clock signal to the associative memory device and the controller which globally communicates one of the plurality of instructions to all of the n-cells simultaneously, within one of the clock cycles.

60 Claims, 5 Drawing Sheets

U.S. PATENT DOCUMENTS

| | | | |
|---|---|---|---|
| 5,828,593 | A | 10/1998 | Schultz et al. |
| 6,089,453 | A | 7/2000 | Kayser et al. |
| 6,295,534 | B1 | 9/2001 | Mann |
| 6,317,819 | B1 | 11/2001 | Morton |
| 6,542,989 | B2 | 4/2003 | Duranton |
| 6,760,821 | B2 * | 7/2004 | Stefan et al. ............... 711/154 |

FOREIGN PATENT DOCUMENTS

| | | |
|---|---|---|
| JP | 06-068053 | 3/1994 |
| JP | 11-345218 | 12/1999 |
| JP | 2001-045523 | 2/2001 |
| JP | 2001-229138 | 8/2001 |
| WO | WO 01/53933 | 7/2001 |

OTHER PUBLICATIONS

Mitu et al., "A CMOS Implementation of a Connex Memory," pp. 579-582, IEEE, 1997.

Stefan, Gheorghe, "Silicon or Molecules? What's the Best for Splicing?", Technical Univ. of Bucharest, Dept. of Electronics, pp. 158-181, 1998.

Stefan, Gheorghe, The Connex Memory. "A Physical Support for Tree/List Processing", Technical Univ. of Bucharest, Dept. of Electronics, pp. 1-22, 1994.

Stefan, Gheorge and Benea, Robert, "Connex Memories & Rewriting Systems", Politehnica Univ. of Bucharest, Dept. of Electronics, pp. 1299-1303, 1998.

Stefan, Denisa and Stefan, Gheorghe, "Bi-thread Microcontroller as Digital Signal Processor", 1997 IEEE.

Hascsi, Zoltan, Mitu, Bogdan, Petre, Mariana and Stefan, Gheorghe, "High-Level Synthesis of an Enhanced Connex Memory", 1996 IEEE, pp. 163-166.

Stefan, G. and Dragnici, F., "Memory Management Unit With a PerformantLRU Circuit" Polytechnic Institute of Bucharesi, pp. 89-96, Jan. 1991.

Thiebaut, Dominique and Stefan, Gheorghe, "Local Alignments of DNA Sequences with the Connex Engine" pp. 1-12, Sep. 2001.

Stefan, Gheorghe and Malita, Mihaela, "The Splicing Mechanism and the Connex Memory" Technical Univ. of Bucharest, Dept. of Electronics; Univ. of Bucharest, Fac. of Mathematics, pp. 225-229, 1997.

Hascsi, Zoltan and Stefan, Gheorghe, "The Connex Content Addressable Memory (C2AM)" "Politehnica" University of Bucharest, Electronics & Telecommunications Dpt., pp. 422-425, Sep. 1995.

Shaw D E et al: "Active Memory Chip: A Brief Survey And Case Study" Circuits, Systems And Signal processing, Cambridge, MS, US, vol. 6, No. 2, 1987 pp. 239-258, XP000747239.

Yamashita et al., "A 3.84 GIPS Integrated Memory Array Processing with 64 Processing Elements and a 2-Mb SRAM," IEEE Journal of Solid-Sate Circuits, vol. 29, No. 11, Nov. 1994.

* cited by examiner

Figure 4: The structure of a cell.

Figure 5: The structure of the transcoder.

CELLULAR ENGINE FOR A DATA PROCESSING SYSTEM

CROSS REFERENCE TO RELATED APPLICATIONS

This application claims priority to the expired U.S. Provisional Application Ser. No. 60/431,154 entitled "ENHANCED VERSION OF CONNEX MEMORY", filed on Dec. 5, 2002, hereby incorporated by reference in its entirety. The subject matter of this application relates to U.S. Pat. No. 6,760,821 entitled "A MEMORY ENGINE FOR THE INSPECTION AND MANIPULATION OF DATA", issued on Jul. 6, 2004, and U.S. Pat. No. 7,107,478 entitled "DATA PROCESSING SYSTEM FOR A CARTESIAN CONTROLLER", issued on Sep. 12, 2006, both of which are herein incorporated by reference in their entirety.

FIELD OF THE INVENTION

The invention relates generally to an engine for a data processing system, and more particularly, to a cellular engine for a data processing system that implements an active associative memory device, or associative engine, to increases data processing speeds and efficiency.

BACKGROUND OF THE INVENTION

Automated or semi-automated data processing systems are integral components in a wide variety of applications. Typically, data management systems are embedded within a larger computerized apparatus or system and serve to assist or facilitate those applications running in the larger computerized system, such as by performing necessary arithmetic operands, data conversion or the like.

As is known, basic data processing systems may be categorized as single instruction, single data stream (SISD) devices and typically utilize, in their simplest expression, a processor, an interface and a memory device. The processor performs directed tasks in response to instructions inputted either by a user, or by another component of an overall system. In performing its designated tasks, the processor relies upon the interface to communicate commands, such as data requests, to the memory device, as well as to receive thereby specified data stored within the memory device.

Figure 1:
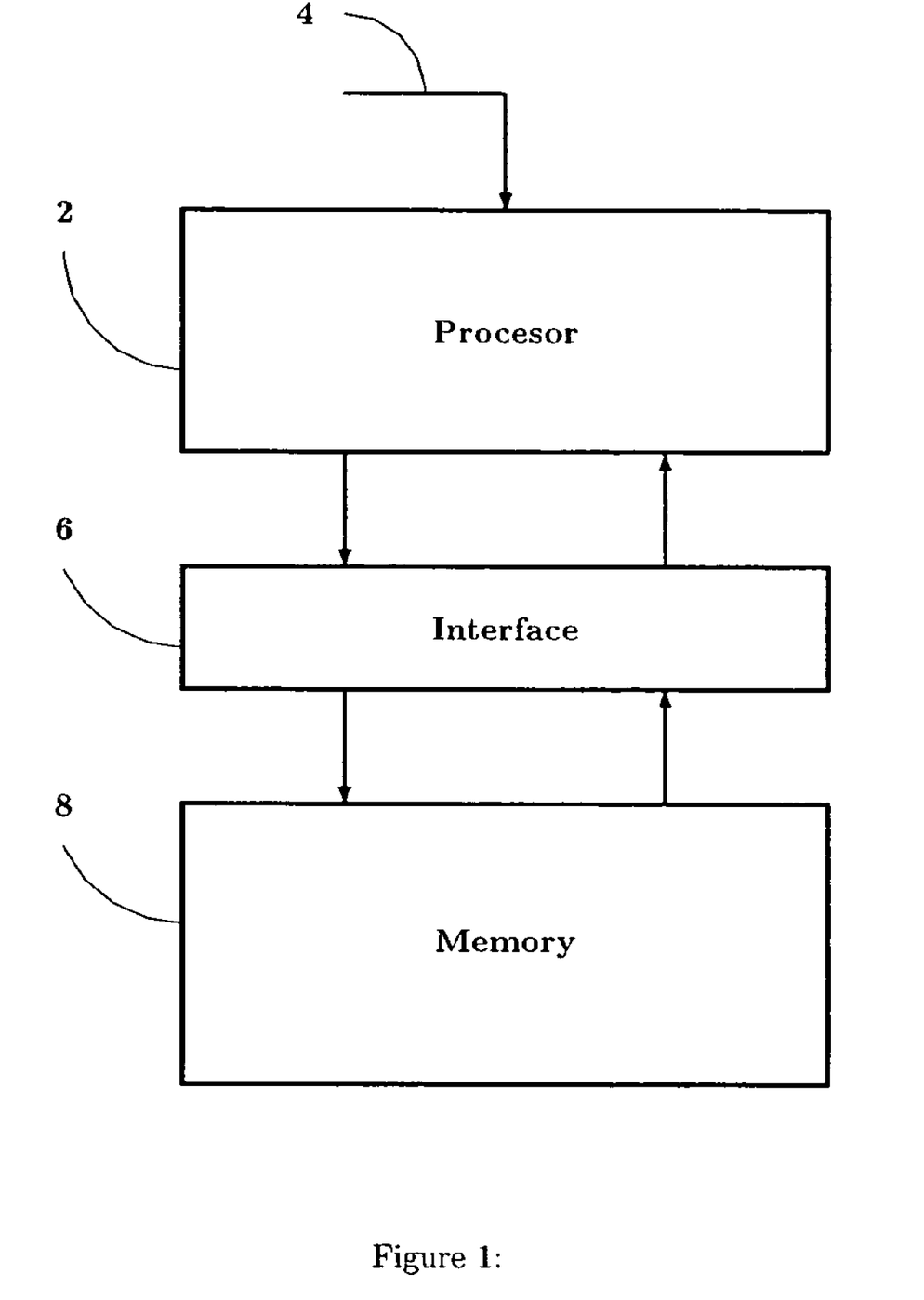
FIG. 1 is a block diagram illustrating a known SISD data processing architecture.

Known data processing systems most often utilize conventionally addressed memory devices. That is, known data systems utilize memory devices which include defined locales therein, each locale having its own particularized address. In this manner, should the processor desire to add the value stored at address A with the value stored at address B, the memory device will proceed to the specific, addressed locations, or cells, within the memory device, and communicate these values, via the interface, to the processor where the appropriate summation can occur. In such systems, the nature and capability of the integral components, that is, the nature and capabilities of the processor and the memory devices, are well defined and distinct from one another. FIG. 1 depicts such a known data processing system wherein processor 2 operates in response to tasks inputted via input line 4. An interface 6 is thereafter utilized to communicate instructions, such as data requests, to the memory device 8, as well as to receive thereby specified data stored within the memory device 8.

It is also known that data processing systems may include more than one processor and memory device, and further, that these multiple components may be part of a system that executes multiple streams of instructions. These multiple instruction streams, multiple data streams (MIMD) devices can be viewed as large collections of tightly coupled SISD devices where each processor in the system, although operating in overall concert with the other integrated processors, is responsible for a specific portion of a greater task. That is, the effectiveness of MIMD devices is typically limited to those specified arenas where the problem to be solved lends itself to being parsable into a plurality of similar and relatively independent sub-problems. The nature and capabilities of those integral components of MIMD devices are also well defined and distinct from one another.

Another known data processing system involves single instruction, multiple data streams (SIMD) devices. These SIMD devices utilize an arbitrary number of processors which all execute, in sync with one another, the same program, but with each processor applying the operator specified by the current instruction to different operands and thereby producing its own result. The processors in a SIMD device access integrated memory devices to get operands and to store results. Once again, the nature and capabilities of those integral components of a SIMD device are well defined and distinct from one another in that computations are executed by the processors that must have some type of access to a memory device to do their job.

While known data processing systems are therefore capable of processing large amounts of data, the defined and unchanging nature of the processors and memory devices limits the speed and efficiency at which various operations may be completed.

Various architectures have also been constructed which utilize another class of memory devices which are not conventionally addressed. These memory devices are typically described as being 'associative' memory devices and, as indicated, do not catalog their respective bits of data by their location within the memory device. Rather, associative memory devices 'address' their data bits by the nature, or intrinsic quality, of the information stored therein. That is, data within associative memory devices are not identified by the name of their locations, but from the properties of the data stored in each particular cell of the memory device.

A key field of fixed size, is attached to all data stored in most associative memory devices. A search key may then be utilized to select a specific data field, or plurality of data fields whose attached key field(s) match the search key, from within the associative memory device, irrespective of their named location, for subsequent processing in accordance with directed instructions.

While the implementation of associative memory devices is therefore known, these devices have always been utilized as specialized blocks, or components, within known data processing systems employing standard processors, interfaces and conventionally addressed memory devices. That is, although known associative memory devices do not employ conventional addressing protocols, they are incapable of processing the information themselves, relying instead upon known processors and external memory devices in a manner consistent with known SISD, SIMD and MIMD architectures.

With the forgoing problems and concerns in mind, the present invention therefore seeks to provide an engine for a data processing system that overcomes the above-described drawbacks by utilizing an active associative memory device using variable-size keys whose cells, by selectively acting as both a processor and a memory device, never have to access a separate memory block to do their jobs, thus substantially reducing processing, computational and communication times.

SUMMARY OF THE INVENTION

It is an object of the present invention to provide an efficient data processing system.

It is another important aspect of the present invention to provide a cellular engine for a data processing system that implements an active associative memory, or associative engine device, in a manner which increases data processing speeds and efficiency.

It is another important aspect of the present invention to provide a cellular engine for a data processing system that implements an active associative memory, or associative engine device whose cells, by selectively acting as both a processor and a memory device, never have to access a separate memory block to do their jobs.

It is another important aspect of the present invention to provide a cellular engine for a data processing system that implements an active associative memory device, or associative engine, whose individual cells can selectively process a given instruction based upon their respective state as set by a globally propagated instruction or query.

It is another important aspect of the present invention to provide a cellular engine for a data processing system that implements an active associative memory device, or associative engine, whose individual cells can selectively process, in parallel, a given instruction based upon their respective state, all within a single clock cycle.

It is another important aspect of the present invention to provide a cellular engine for a data processing system that implements an active memory device, or cellular engine, that allows the use of variable-length key fields.

It is another important aspect of the present invention to provide a cellular engine for a data processing system that implements an active memory device, or cellular engine, whose structure is homogeneous, thus allowing the very same piece of information stored in memory to be (part of) either the key field or data field at different times during the execution of a program.

It is another object of the present invention to provide a cellular engine for an efficient data processing system that enables the dynamic limitation of the search space within an active associative memory device.

It is another object of the present invention to provide a cellular engine for an efficient data processing system that provides for the selective accessibility of either end of the cell array.

It is another object of the present invention to provide an engine for an efficient data processing system which is capable of regulating data transmission between two or more cells within an associative memory device.

According to one embodiment of the present invention, a data processing system includes an associative memory device containing n-cells, each of the n-cells includes a processing circuit. A controller is utilized for issuing one of a plurality of instructions to the associative memory device, while a clock device is utilized for outputting a synchronizing clock signal comprised of a predetermined number of clock cycles per second. The clock device outputs the synchronizing clock signal to the associative memory device and the controller globally communicates one of the plurality of instructions to all of the n-cells simultaneously, within one of the clock cycles.

These and other objectives of the present invention, and their preferred embodiments, shall become clear by consideration of the specification, claims and drawings taken as a whole.

DETAILED DESCRIPTION OF THE PREFERRED EMBODIMENT

Figure 2:
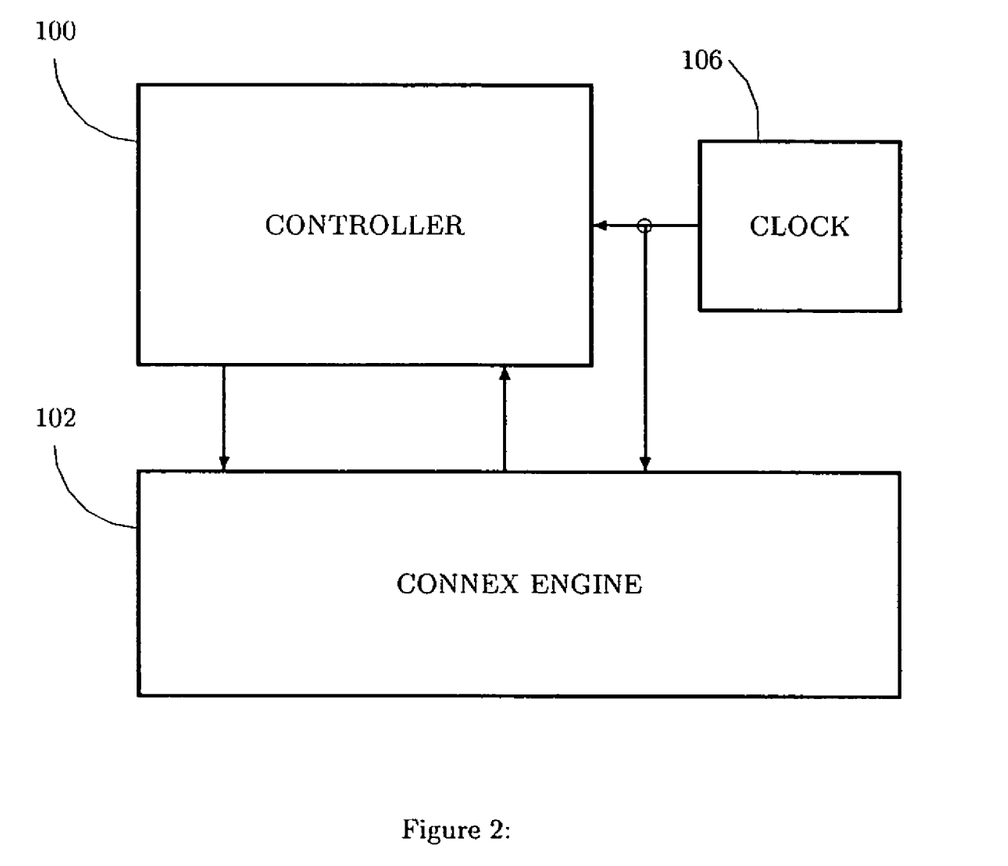
FIG. 2 is a block diagram showing the general configuration of a data processing system, including a memory engine and a synchronizing clock element, according to one embodiment of the present invention.

FIG. 2 depicts the architectural relationship between a controller 100, hereinafter referred to as the Cartesian Controller (CC), and a cellular engine 102, hereinafter referred to as the Connex Engine (CE). A synchronizing clock circuit 106 is utilized to coordinate the operation of the CC 100 and the CE 102 such that one of a plurality of instructions may be issued by the CC 100 and transferred to the CE 102 for parallel execution and processing.

The clock circuit 106 is capable of outputting a predetermined number of clock cycles per second, and the CC 100 is capable of performing an internal operation such that the CC 100 may perform one of a plurality of internal operations while also issuing in parallel one of a plurality of instructions to the CE 102 within a single clock cycle.

Figure 3:
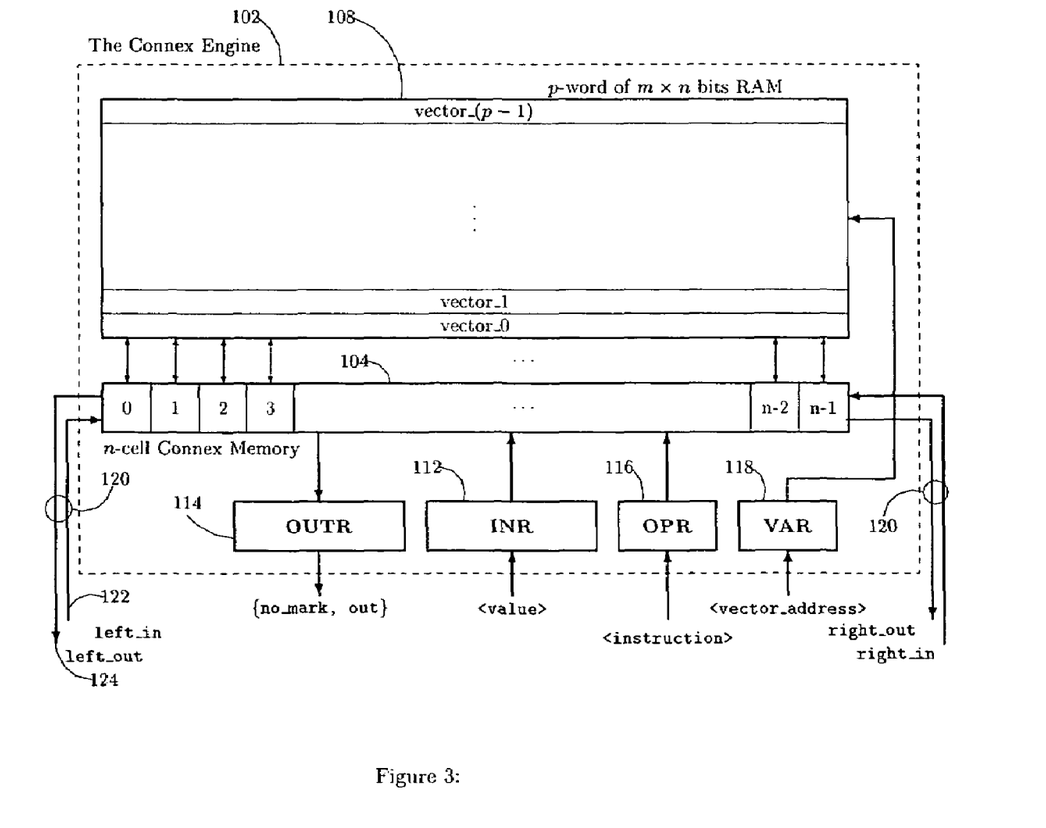
FIG. 3 is a block diagram showing a more detailed view of the memory engine shown in FIG. 2.

As depicted in FIG. 3, the CE 102 is made up of an array of active cells, or processing elements, embodied as the Connex Memory (CM) 104 and a RAM (random access memory) containing a plurality of vectors 108, each vector having the same storage capacity as the CM 104 and thus being capable of selectively storing the entire contents of the CM 104. That is, the CE 102 includes the CM 104 having n-cells and the associated vector memory 108, which is under the control of the sequential CC 100. In one embodiment of the present invention, the purpose of the memory vectors 108, is to allow for search, insert and delete operations to be performed on character strings longer than may be accommodated within the CM 104, and to offer a lower cost of implementation and reduced power dissipation, as will be discussed in more detail later.

It will be readily appreciated that the present invention contemplates that the CE 102 may have any number of circuit-specific configurations without departing from the broader aspects of the present invention provided that the CC 100 is capable of issuing commands to, and receiving data from, the CE 102.

Referencing FIG. 3, each n-bit cell in the CM 104 contains the following registers:

'mark'—a one-bit marker register;

'w'—the main register, which plays a role similar to that of an accumulator in a more conventional design, while also being associated with a number of general registers equal to the number of memory vectors.

Notations: Let x be a bit field of length m and y be a bit field of length n: $\{x, y\}$ denotes a bit field of length m+n formed by appending y to x. The notation can be generalized to any number of bit fields, e.g. for three arguments: $\{a, b, c\} = \{a, \{b, c\}\} = \{\{a, b\}, c\}$.

Let r be an (n+1)-bit register and $n \geq k \geq 0$: $r[k]$ denotes the (k+1)-th bit in r, counting from the right end (k=0) to the left end (k=n).

Let r be an (n+1) bit register and $n \geq m \geq k \geq 0$: $r[m:k]$ denotes a bit field of length m−k+1, $\{r[m], r[m-1], \ldots, r[k]\}$.

Therefore, the contents of an m-bit cell within the CM 104 are the contents of its w register appended to the contents of its mark register:

cell [m−1:0]={mark, value}
value [m−2:0]={ext, symbol}
symbol [m−3:0]

where ext stands for the extension bit, used to create an alphabet of special values (for ext=1).

An important aspect of the present invention resides in the ability of each m-bit cell within the CM 104 to actively process data in addition to storing data. The processing of data may occur either within each m-bit cell, or by affecting the cell immediately to the left or right of a predetermined cell. It should be noted that by enhancing the functionality of each m-bit cell within the CM 104 in this manner, the present invention exhibits a system-level behavior that is more complex and, as such, exceeds the performance of other data processing systems.

It is another important aspect of the present invention that the ability to actively process data at the cell level within the CM 104 is accomplished, in part, by the ability of each cell to be 'marked', which is part of the condition, or predicate, designating it as a cell which will subsequently perform a task, or execute an operand, on itself, or an adjacent cell within the CM 104.

Returning to FIG. 3, for the purposes of the present invention, a cell is considered 'marked' if the one-bit, internal cell register mark=1 and is considered 'not marked' if mark=0. Moreover, the CM 104 has a 'left limit' and a 'right limit' that can be dynamically adjusted by issuing specialized instructions. In addition, the 'search space' of the CM 104 is that segment of the CM 104 which is delimited by the left limit and the right limit. It will be readily appreciated that the internal cell register mark may be greater than one bit in length without departing from the broader aspects of the present invention.

As mentioned previously, the execution of code supplied to the CE 102 is driven by the CC 100. The CE 102/CC 100 interface makes use of four special registers, as shown in FIG. 3:

'INR' 112—data input register—all CE 102 instructions get their (immediate) data argument (if any) from INR (supplied by CC 100);

'OUTR' 114—data output—contains the 'no mark' bit and a value. If at least one of the cells is marked, OUTR contains 0 followed by the value contained in the first marked cell; otherwise OUTR contains 1 followed by an implementation-dependent special value, such as 11 . . . 1;

'OPR' 116—instruction register, contains the operation code for the current CE 102 instruction (the source is a dedicated field in the CC 100 instruction);

'VAR' 118—address register for the vector memory. The VAR 118 register is updated by special CC 100 instructions and is used as an argument to instructions that explicitly manipulate vectors; The VAR 118 register is also used in the execution of all operations involving the general registers associated with cells.

As further represented in FIG. 3, input/output lines 120 may be selectively utilized to access both ends of the CM 104. As utilized herein, the input/output lines 120 have the following meaning:

'left_in' 122={w, mark, eq, first}, by default all are 0 (eq=1 means that the two operands in the cell are equal; first=1 means the cell is the first marked cell);

'left_out' 124={w, mark, eq, first}, come from the first cell;

'right_in' 126={w, mark, eq, first}, by default all are 0;

'right_out' 128={w, mark, eq, first}, come from the last cell.

Figure 4:
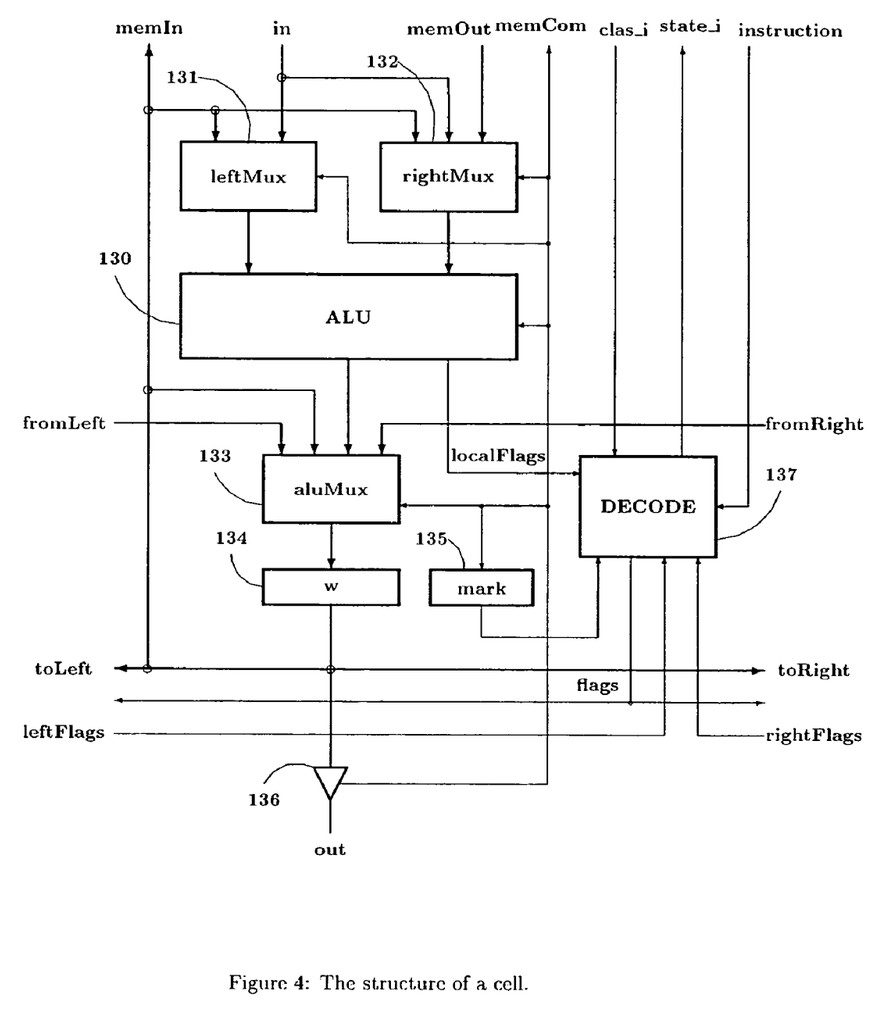
FIG. 4 is a block diagram showing the structure of a cell, or processing element, according to one embodiment of the present invention.

FIG. 4 illustrates one embodiment of an internal structure of the m-bit cells within the CM 104. As shown in FIG. 4, the internal structure of each cell includes the following circuits:

ALU: arithmetic and logic unit 130 that performs addition, subtraction, comparisons, and bitwise logic functions rightMux: multiplexer 132 which selects the right operand for ALU from:
  w: the value stored in the accumulator register 134
  n: the value received from the input register 112
  memOut: the value read from the vector memory addressed by the vector address register, VAR 118 leftMux: multiplexer 131 which selects the left operand for ALU from:
  w: the value stored in the accumulator register 134
  in: the value received from the input register 112 aluMux: multiplexer 133, which selects the value to be loaded into the accumulator register (w 134) from:
  w: the value stored in the accumulator register 134
  fromLeft: the value stored in the accumulator register of the left cell
  fromRight: the value stored in the accumulator register of the right cell
  the output of ALU 130 w: the accumulator register 134 mark: the marker register tristate output buffers

Figure 5:
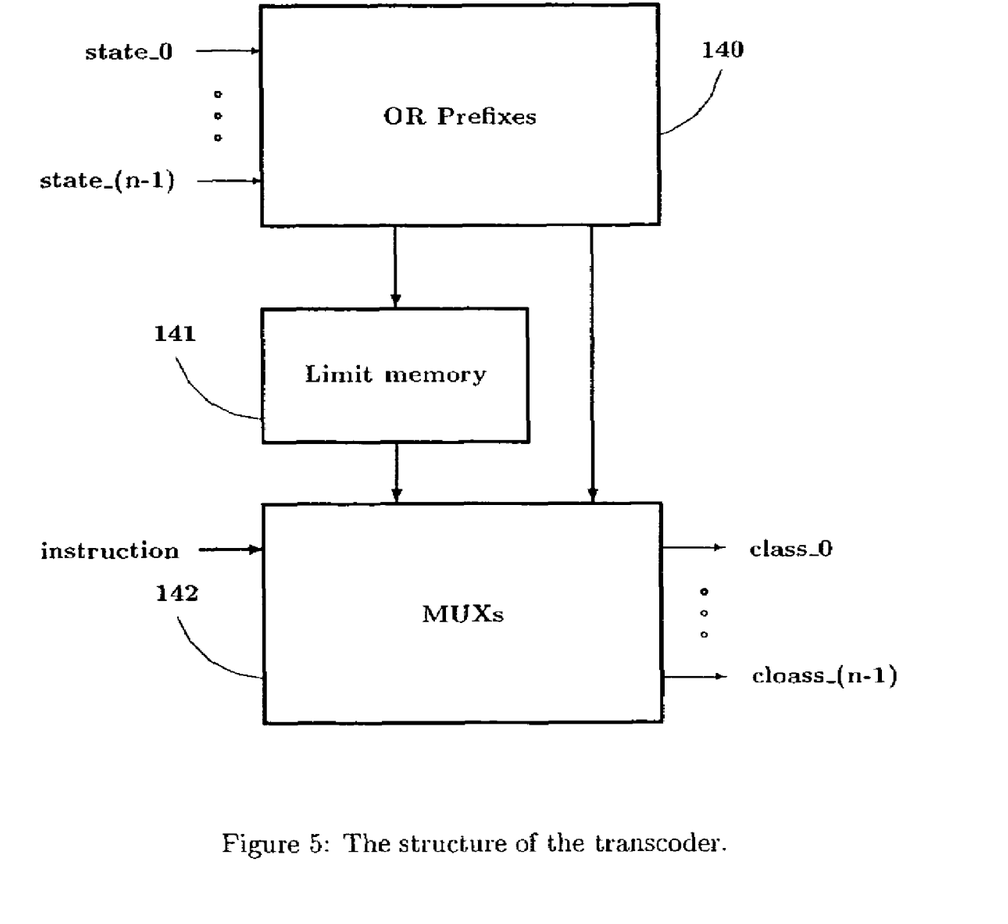
FIG. 5 is a block diagram showing the structure of the transcoder.

DECODE: a combinational circuit 137 which decodes the instructions according to the local context generated by:
  localFlags: generated by ALU
  leftFlags: the flags received from the left cell
  rightFlags: the flags received from the right cell
  class_i: classification code received from the TRANSCODER generating:
    command codes for leftMux, rightMux, ALU, aluMux, mark, tristate buffers
  flags from neighboring cells
  state_i bit of the cell for the TRANSCODER The Transcoder FIG. 5 illustrates the organization of the TRANSCODER, a circuit integrated with the CE 102 and acting as part of a control interconnection network. That is, the TRANSCODER is utilized, in part, to classify each cell according to:

its state bit (state_i), (i.e. the local state)
the state bits of all cells, (i.e. the global state)
the current instruction to be performed, into the following categories:
  marked cell
  first marked cell
  last marked cell
  cell within limits (the limits are stored in a memory area of the TRANSCODER)
  active cell.

It will be readily appreciated that other cell categories could be added to the above without departing from the broader aspects of the present invention.

The TRANSCODER receives from each cell a state bit (state_0 state_1, . . . , state_(n−1)) and sends back to each cell a 3-bit code specifying the class(es) to which it belongs (class_0, class_1, . . . , class_(n−1)).

The building blocks of the transcoder are:
OR Prefixes: a circuit 140 calculating mainly the relative positions of cells according to the classification to be performed
Limit memory: two latches 141 used to store information about the limits
MUXs: multiplexers 142 which, based on the current instruction, select the class of each cell The TRANSCODER can be implemented in two different ways in order to optimize its size and speed:
a linear version for small values of n
a bi-dimensional version (for large values of n), containing a LINE TRANSCODER and a COLUMN TRANSCODER, each having a size of the order $O(n^{1/2})$.

Another important aspect of the present invention, therefore, is the ability of the CC 100 to issue instructions to the CE 102 and cause such instructions to be broadcast, in parallel and in a single clock cycle, to all cells within the CM 104. Those cells meeting the criteria set out in the instructions from the CC 100 may, for example, independently and selectively mark themselves, simultaneously in the same clock cycle, whereby subsequent instructions or operations, in the following clock cycle, may be effectuated according to the resulting classification, again in parallel and in a single clock cycle.

It is therefore another important aspect of the present invention that the TRANSCODER not only classifies each cell in accordance with its local state, for example, its marked or non-marked state, but also in accordance to its global state and the current instruction. That is, while one aspect of a cell's classification by the TRANSCODER may be that a particular cell's local state is 'marked', it is also important for such a cell to 'know' its 'global state' with respect to all other cells, such as whether the 'marked' cell is the 'first marked' cell or the 'last marked' cell.

By way of an example, suppose certain cells within the CM 104 have been marked, via some property of these cells as indicated by an instruction from the CC 100 in the previous clock cycle, as follows: (marked cells being represented by bolded numbers in the string):

CM: 2 5 2 7 6 4 10 . . .

Suppose next that the instruction "addr 5" is broadcast to all cells within the CM 104, again in parallel and in a single clock cycle, where vector 5 in the vector memory 108 is as follows:

Line 5: 3 4 7 8 2 5 12 . . .

All marked cells within the CM 104 will then add the contents of their data field to the contents of the corresponding element in vector 5, with the result of this operation being stored in the respective cells of the CM 104, as follows:

CM: 5 9 2 7 6 9 10 . . .

As indicated by the example above, the marked/non-marked state of each cell within the CM 104 is not affected by the particular instruction issued by the CC 100 (in this example; although as noted, certain instructions will affect the marked state of each cell within the CM 104). Moreover, all addition operations are executed simultaneously (that is, in parallel with one another) and internal to each marked cell within a single clock cycle.

As further indicated by the example above, the data processing system of the present invention can implement, at the system level, operations defined on vectors of values; in this example the vector values are the CM 104 data and vector 5 of the vector memory 108. In this regard, the data processing system of the present invention includes a CE having a CM 104 with a linear array of active cells (i.e., processing elements) where each cell within the CM 104 has one or more marker bits and one accumulator (134); at same time, at the level of each cell, the corresponding elements of all vectors can be seen as a set of associated registers. (the number of associated registers is therefore equal to the number of vectors 108).

Moreover, it is another important aspect of the present invention that by concatenating the accumulators and individual associated registers of each cell within the CM 104 respectively, the data processing system of the present invention provides for operations on vectors of values, thereby enabling matrix computations and the like.

As contrasted to SIMD and MIMD systems, discussed in the Background of the present invention, the data processing system of the present invention does not rely upon an unchanging and strict delineation between the operations of a processor and a linked memory device.

In the data processing system of the present invention, information may be stored for retrieval in the CM 104, but conventional "memory address" is not a concept; although each cell within the CM 104 may itself selectively process information in response to globally issued commands, it is not a processor per se, although each cell within the CM 104 does contain a processing circuit, as discussed previously; and the performance of the data processing system of the present invention is strictly a linear function of its size and applicable across a wide range of programs/applications in a manner that is not exhibited by other known programmable machines.

It will be readily appreciated that the data processing system of the present invention is not limited in the nature and configuration of the processing circuit contained within each of the n-cells in the CM 104.

In accordance with the present invention, the CE 102 has a rich set of instructions, grouped in the following classes:
global management—setting and resetting the CM 104 limits; exchanging data between the CM 104 and RAM vectors 108;
search/access—associative access to one or more of the cells of the CM 104;
marker manipulation;
data store and transfer;
arithmetic and logic;
conditional; and
index.

Note that all instructions for the CE 102 are executed in a single machine cycle.

The CE 102 does not itself have access to a program memory to fetch its instructions—every cycle its cells expect to get an operation code in a special register, but it takes a different entity, in the present case, the CC 100, to do it for them; the code is sequential and there needs to be a single point of access to fetch it. The main job of the CC 100 is therefore to drive the execution of the programs of the CE 102, i.e., fetch instructions to be executed by individual cells and place them in an internal register; at the same time, it serves as a gateway to CE 102 and thereby takes care of all input/output interactions. The CC 100 also executes simple sequential operations without which it would be impossible to write meaningful code for such a machine: one class of such operations are the so-called "control primitives", i.e., those instructions that are used to code decision-making sequences (e.g. if, while, repeat, etc).

Pseudocode

In the following, pseudocode that uses a notation inspired from the C programming language is utilized to specify informally the semantics of most instructions of the CE 102. It will be readily appreciated that this kind of description is not intended to limit the expression of the actual implementation of instructions, and that other expressions are also contemplated by the present invention.

A special pseudo-statement, forall, describes actions executed by sets of cells in parallel; its syntax may be expressed as:

```
<forall statement> : := forall [(<forall condition>)] <statement>;
<forall condition> : := marked
                      | in searchSpace;
```

Consider the following three variants of forall:

```
1.   forall
         <action>;
2.   forall (in searchSpace)
         <action>;
3.   forall (marked)
         <action>;
```

Variant 1 may be utilized to specify an action executed by all the cells in the CM 104. Variant 2 may be utilized for an action involving all the cells in the search space (see above), while variant 3 applies to cases when all marked cells execute the specified action.

At the level of each cell, the complete data set needed to execute all the instructions, together with their names used in pseudo-code, are:
  the cell's registers (including associated registers), i.e. w, mark, r0, r1, . . . , rN; and
  the content of the cell's right and left neighbors, i.e. right_w, right_mark, and left_w, left_mark respectively.

At the same time, predicates first_mark and last_mark can be evaluated at the cell level; the former is true for the leftmost marked cell in CM, while the latter is true in the case of the rightmost marked cell.

Global Management Instructions ldl <value>: load line immediate; the contents of all CM cells (markers and w registers) are restored from the memory vector selected by the value generated to the input of VAR:
  CM=RAM[VAR];

stl <value>: store line immediate; the contents of all CM cells (markers and w registers) are saved to the memory vector selected by the value generated to the input of VAR
  RAM[VAR]=CM;

llim: left limit; sets the left limit of the search space to the first marked cell. No markers are affected. Note that the left limit is the leftmost cell affected by search/access instructions.

rlim: right limit; sets the right limit of the search space to the first marked cell. No markers are affected. Note that the right limit is the rightmost cell affected by basic search/access instructions.

droplim: remove limits; the left limit is set to the leftmost CM cell, while the right limit is set to the rightmost CM cell. No markers are affected.

Search/Access Instructions

Note: All the instructions described in this section act only within the limits of the search space; arguments are m−1 bit values available in the input register (INR).

find <value>: identifies all the cells holding values equal to the argument. For every cell where a match is found, the marker bit of its right neighbour is set to one; all the other marker bits are set to 0:
  forall (in searchSpace)
  mark=(left_w==INR)? 1:0;

match <value>: compares values stored in all marked cells to the argument. If a match is found in a given cell, the marker bit of the following cell is set to 1; all the other marker bits are set to 0:
  forall (in searchSpace)
  mark=(left_mark && left_w==INR)? 1:0;

lfind <value>: find and mark left; identifies all cells holding a value equal to the argument. For every cell where a match is found, the marker bit of its left neighbour is set to one; all the other marker bits are set to 0:
  forall (in searchSpace)
  mark=(right_w==INR)? 1:0;

lmatch <value>: match and mark left; compares values stored in all marked cells to the argument. If a match is found in a given cell, the marker bit of the preceding cell is set to 1; all the other marker bits are set to 0:
  forall (in searchSpace)
  mark =(right_mark && right_w==INR)? 1:0;

markall: marks all cells in the search space:
  forall (in searchSpace)
  mark=1;

addmark <value>: marks all the cells containing a value equal to the argument; no other markers are affected:

```
forall (in searchSpace) {
    if (w == INR)
        mark = 1;
}
``` mark <value>: marks all the cells containing a value equal to the argument; all the other marker bits are set to 0.
  forall (in searchSpace)
  mark=(w==INR)? 1:0;

clr <value>: clears the marker bit of all cells containing a value equal to the argument.

```
forall (in searchSpace) {
    if (w == INR)
        mark = 0;
}
```

Marker Manipulation Instructions
  clrf: clear first; clears the first (i.e. leftmost) marker.

```
forall {
    if (first_mark)
        mark = 0;
}
``` trace: duplicates markers leftward.

```
forall {
    if (right_mark)
        mark = 1;
```

```
if (mark)
    mark = 1;
}
``` keepl: keep last; clears all markers except the last (i.e. rightmost) one.

```
forall {
    if (!last_mark)
        mark = 0;
}
``` clrl: clear last; clears the last (i.e. rightmost) marker.

```
forall {
    if (last_mark)
        mark = 0;
}
``` left: shifts all markers one cell to the left.
forall
mark=right_mark;
right: shifts all markers one cell to the right.
forall
mark=left_mark;
cright: conditional shift right; all markers are shifted one cell to the right unless their right neighbour contains a value equal to the argument, in which case 11 . . . 1 is substituted for that value.

```
forall {
    if (left_mark && w == INR) {
        mark = 0;
        w = 11...1;
    }
    if (left_mark && w != INR)
        mark = 1;
    if (mark)
        mark = 0;
}
``` cleft: conditional shift left; all markers are shifted one cell to the left unless their left neighbour contains a given value, in which case 11 . . . 1 is substituted for the value.

```
forall {
    if (right_mark && w == INR) {
        mark = 0;
        w = 11...1;
    }
    if (right_mark && w != INR)
        mark = 1;
    if (mark)
        mark = 0;
}
```

Data Store and Transfer Instructions
nop: no operation:
reset <value>: stores a value in all cells. No markers are affected.

forall
w=INR;
get: the value stored in the first marked cell is sent to the CM output and its marker moves one position to the right. No other markers are affected.

```
forall {
    if (first_mark) {
        OUTR = w;
        mark = 0;
    }
    if (left_mark is first_mark)
        mark = 1;
}
``` back: the value stored in the first marked cell is sent to the CM output and its marker moves one position to the left. No other markers are affected.

```
forall {
    if (first_mark) {
        OUTR = w;
        mark = 0;
    }
    if (right_mark is first_mark)
        mark = 1;
}
``` set <value>: stores a value in the first marked cell. Markers are not affected.

```
forall (marked) {
    if (first_mark)
        w = INR;
}
``` setall <value>: stores a value in all marked cells. Markers are not affected.
forall (marked)
w=INR;
ins <value>: inserts a value before the first marked cell. The contents of all cells to the right of the insertion point are shifted one position to the right. Note that the value initially held in the rightmost cell is lost in the process.

```
forall {
    if (right of first_mark)
        w = left_w;
    if (first_mark)
        w = INR;
    mark = left_mark;
}
``` del: deletes the value stored in the first marked cell. The cell remains marked and the contents of all cells to the right of the deletion point are shifted one position to the left.

```
forall {
    if (first_mark)
        w = right_w;
    if (right of first_mark) {
```

-continued

```
        w = right_w;
        mark = right_mark;
    }
}
``` cpr: copy right; for all marked cells, copies the whole cell contents (w register and marker) to the right neighbour.

```
forall {
    if (left_mark)
        w = left_w;
        mark = left_mark;
}
``` cpl: copy left; for all marked cells, copies the whole cell contents (w register and marker) to the left neighbour.

```
forall {
    if (right_mark)
        w = right_w;
        mark = right_mark;
}
``` ccpr <value>: conditional copy right; for all marked cells, copies the value held in register w to the right neighbour; markers are also copied, unless a value equal to the argument is stored in w.

```
forall {
    if (left_mark && left_w != INR) {
        w = left_w;
        mark = 1;
    }
    else
        mark = 0;
}
``` ccpl <value>: conditional copy left; for all marked cells, copies the value held in register w to the left neighbour; markers are also, copied, unless a value equal to the argument is stored in w.

```
forall {
    if (right_mark && right_w != INR) {
        w = right_w;
        mark = 1;
    }
    else
        mark = 0;
}
``` ld <address>: load immediate; for all marked cells, load into w the value held in register <r>, part of the RAM vector selected by the value generated to the input of VAR.
  forall (marked)
  w=<r>;
st <address>: store immediate; for all marked cells, move the value held in w to register <r>, part of the RAM vector selected by the value generated to the input of VAR.
  forall (marked)
  w=<r>;

Arithmetic & Logic Instructions

All arithmetic instructions are carried out on m−2 bit numbers represented in 2's complement: the operand <op> is one of the associated cell registers (part of the RAM vector selected by the value generated to the input of VAR), or a m−2 bit number supplied by the controller:
  <op>::=INR[m−3:0](immediate value)|r(RAM vector element)
add <op>: add the operand to the w register of all marked cells. Markers are not affected.
  forall (marked)
  w+=<op>;
fadd <op>: full add, with the right extension being treated as a carry (see add).

```
forall {
    if (mark)
        w += (<op> + right_w[m−2]);
    if (left_mark)
        w[m−2] = 0;
}
``` sub <op>: subtract the operand value from the value stored in the w register of all marked cells. No markers are affected.
  forall (marked)
  w−=<op>;
fsub <op>: full subtract, with the right extension being treated as a carry (see sub).

```
forall {
    if (mark)
        w −= (<op> + right_w[m−2]));
    if (left_mark)
        w[m−2] = 0;
}
``` half [<op>]: for all marked cells, divide by 2 the register operand and store the result in w. No markers are affected.
  forall (marked)
  w={<op>[m−2:m−3], <op>[m−3:1];
fhalf [<op>]: full half; for all marked cells, divide by 2 the register operand and store the result in w, to which 100 . . . 0 is added if the least significant bit of the left cell is 1. Markers are not affected.
  forall (marked)
  w={<op>[m−2], left_w[0], <op>[m−3:1];
lt <op>: less (or equal); for all marked cells, check whether register w holds a value that is less than, or equal to, that held in <op>; if w<op, then the w extension bit is set to 1; the marker bit is set to 0 if op>w.

```
forall (marked) {
    if (w < <op>)
        w[m−2] = 1;
    if (w > <op>)
        mark = 0;
}
``` flt <op>: full lt; for all marked cells where w<op or whose left neighbour has the w extension bit set to 1, set the extension bit to 1; the left extension bit is cleared and if w>op the marker is also cleared. This instruction is used in conjunction with test for comparisons on multiple consecutive cells.

```
forall {
    if (mark && (w < <op> | | left_w[m-2]))
        w[m-2] = 1;
    if (right_mark)
        w[m-2] = 0;
    if (mark && w > op && !left_w[m-2])
        mark = 0;
}
``` gt <op>: greater (or equal); for all marked cells, check whether register w holds a value that is greater than, or equal to, that held in <op>; if w>op, then the w extension bit is set to 1; the marker bit is set to 0 if w<op.

```
forall (marked) {
    if (w > <op>)
        w[m-2] = 1;
    if (w < <op>)
        mark = 0;
}
``` fgt <op>: for all marked cells where w>op or whose left neighbour has the w extension bit set to 1, set the extension bit to 1; the left extension bit is cleared and if w<op the marker is also cleared. This instruction is used in conjunction with test for comparisons on multiple consecutive cells

```
forall {
    if (mark && (w > <op> | | left_w[m-2]))
        w[m-2] = 1;
    if (right_mark)
        w[m-2] = 0;
    if (mark && w < op && !left_w[m-2])
        mark = 0;
}
``` test: For all marked cells containing a value equal to INR the marker bit is set to 0 and if the extension bit of the cell to the left is 1, then register w is assigned 11 . . . 1 and the extension bit of the cell to the left is cleared

```
forall {
    if (right_mark && right_w == INR)
        w[m-2] = 0;
    if (mark && w == INR && left_w[m-2])
        w = 11...1;
    else if (mark && w == INR)
        mark = 0;
}
``` and <op>: bitwise and; for all marked cells, do a bitwise and between register w and <op>. Markers are not affected.
  forall (marked)
    w &=<op>;

or <op>: bitwise or; for all marked cells, do a bitwise or between register w and <op>. Markers are not affected.
  forall (marked)
    w|=<op>;

xor <op>: bitwise xor; for all marked cells, do a bitwise xor between register w and <op>. Markers are not affected.
  forall (marked)
    w^=<op>;

Conditional Instructions

The following two instructions use an operand register, <r>(part of the RAM vector selected by the value generated to the input of VAR) and a m–1-bit value from INR.
  <r>::=w(for register w)|r(RAM vector element)
  cond <value> [<r>]: for all marked cells, check whether there is at least one bit set to 1 after executing a bitwise 'and' operation between the two operands.
    forall (marked)
      mark=((<r>& INR)!=0)? 1:0;
  ncond <value> [<r>]: for all marked cells, check whether the result of executing a bitwise 'and' operation between the two operands is 0.
    forall (marked)
      mark=((<r> & INR)==0)? 1:0;

Index Instruction
  index: for all marked cells, register w is assigned the value of the cell's relative position with respect to the CM leftmost cell (which has index 0).

As can be seen from the foregoing descriptions and drawing figures, the present invention provides a novel way to process data in a manner which provides increased processing power with a substantial decrease in processing time, silicon area and power consumption. As discussed, the data processing system of the present invention provides for any given instruction and its operand(s) to be communicated, in parallel, to all CM cells, which execute the instruction within the same clock cycle.

Yet another inherent advantage of the data processing system of the present invention involves the ability of each cell within the cellular engine to not only simultaneously execute instructions within a single clock cycle, but to also dynamically limit those cells which execute these globally broadcast instructions via the utilization of both local and global state information. In particular, by utilizing marker bits on an individual cell level, the actual cells within the associative memory are capable of affecting those cells either to the left or right of marked cells in a manner which is heretofore unknown. Therefore, at the system level, the present invention provides for the selective activation, or alteration of the marked state, by associative mechanisms; that is, by the nature or property of the content of the individual cells within the CM 104, rather than a particular designated location address therein.

The present invention therefore combines processing and memory at a very intimate level, meaning that an individual cell of the CM 104 never has to access a separate memory block to do its job. Moreover, operands reside in their own local space at the cell level, therefore results are kept in place, saving communication and processing time, silicon area and power.

It should be noted that some instruction operands are, in fact, broadcast by the CC 100 at the same time as the instruction is globally broadcast.

While the invention had been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A data processing system, said data processing system comprising:
    an associative memory device containing n-cells, each of said n-cells including a processing circuit and m-bits of memory capacity, wherein each of said n-cells include a state field and a data field, said state field comprising a marker bit for encoding a local state of each of said n-cells, thereby indicating one of a marked state and a non-marked state of each of said n-cells;
    a controller for issuing one of a plurality of instructions to said associative memory device, the plurality of instructions comprising a 'right limit' command whereby a right limit of a search space is set to a leftmost cell of said n-cells in said marked state;
    a clock device for outputting a synchronizing clock signal comprised of a predetermined number of clock cycles per second, said clock device outputting said synchronizing clock signal to said associative memory device and said controller; and
    wherein said controller globally communicates one of said plurality of instructions to all of said n-cells simultaneously, within one of said clock cycles.

2. The data processing system of claim 1, further comprising:
    a classification device for selectively operating in association with a local state of each of said n-cells; and
    wherein one of said plurality of instructions is executed by selected cells within said associative memory device in dependence upon said local state of said n-cells as directed by said classification device, said execution of said instruction occurring simultaneously in each of said selected cells within one of said clock cycles.

3. The data processing system of claim 1, wherein:
    one of said plurality of instructions issued by said controller is a 'load line immediate' command whereby the contents of all of said n-cells in said marked state are replaced with data indicated by said 'load line immediate' command.

4. The data processing system of claim 3, further comprising:
    a vector memory containing p-vectors, each of said p-vectors containing n-elements having m-bits each; and
    said data indicated by said 'load line immediate' command corresponds to one of said p-vectors.

5. The data processing system of claim 1, wherein:
    one of said plurality of instructions issued by said controller is a 'store line immediate' command whereby the contents of all of said n-cells in said marked state are saved to a memory vector indicated by said 'store line immediate' command.

6. The data processing system of claims 1, wherein:
    one of said plurality of instructions issued by said controller is a 'left limit' command whereby a left limit of a search space is set to leftmost n-cell of said n-cells in said marked state.

7. The data processing system of claim 1, wherein:
    said controller may dynamically limit a search space within said n-cells.

8. The data processing system of claim 1, wherein:
    one of said plurality of instructions issued by said controller is a 'find' command whereby each of said n-cells holding values equal to an argument indicated by said 'find' command is identified; and
    wherein said 'find' command sets said marker bit to said marked state in each of said n-cells located to the right of said identified n-cells, and sets said marker bit to said non-marked state in all other of said n-cells.

9. The data processing system of claim 1, wherein: one of said plurality of instructions issued by said controller is a 'match' command whereby each of said n-cells having a marker bit in said marked state and having said data field matching an argument indicated by said 'match' command, is identified; and
    wherein said 'match' command sets said marker bit to said marked state in each of said n-cells following said identified n-cells, and sets said marker bit to said non-marked state in all other of said n-cells.

10. The data processing system of claim 1, wherein:
    one of said plurality of instructions issued by said controller is a 'find and mark left' command whereby each of said n-cells holding values equal to an argument indicated by said 'find and mark left' command is identified; and
    wherein said 'find and mark left' command sets said marker bit to said marked state in each said n-cells located to the left of said identified n-cells, and sets said marker bit to said non-marked state in all other of said n-cells.

11. The data processing system of claim 1 wherein:
    one of said plurality of instructions issued by said controller is a 'match and mark left' command whereby each of said n-cells having a marker bit in said marked state and having said data field matching an argument indicated by said 'match and mark left' command, is identified; and
    wherein said 'match and mark left' command sets said marker bit to said marked state in each said n-cells located to the left of said identified n-cells.

12. The data processing system of claim 6, wherein:
    one of said plurality of instructions issued by said controller is a 'markall' command whereby said marker bit of each of said n-cells within said search space is set to said marked state.

13. The data processing system of claim 1, wherein:
    one of said plurality of instructions issued by said controller is an 'addmark' command whereby said marker bit of each of said n-cells containing a value equal to an argument indicated by said 'addmark' command is set to said marked state; and said 'addmark' command does not affect said marker bit of any other of said n-cells.

14. The data processing system of claim 1, wherein:
    one of said plurality of instructions issued by said controller is a 'mark' command whereby said marker bit of each of said n-cells containing a value equal to an argument indicated by said 'mark' command is set to said marked state; and
    said 'mark' command sets said marker bit to said non-marked state in each of said n-cells not containing a value equal to an argument indicated by said 'mark' command.

15. The data processing system of claim 1, wherein:
    one of said plurality of instructions issued by said controller is a 'clr' command whereby said marker bit of each of said n-cells containing a value equal to an argument indicated by said 'clr' command is set to said non-marked state.

16. The data processing system of claim 1, wherein:
    one of said plurality of instructions issued by said controller is a 'clear first' command whereby said leftmost of said n-cells having said marker bit set to said marked state is set to said non-marked state.

17. The data processing system of claim 1, wherein:
one of said plurality of instructions issued by said controller is a 'trace' command whereby said marker bit of all of said n-cells is duplicated leftward in said associative memory device.

18. The data processing system of claim 1, wherein:
one of said plurality of instructions issued by said controller is a 'keepl' command whereby said marker bit of all of said n-cells except for a rightmost of said n-cells in said marked state is set to said non-marked state.

19. The data processing system of claim 1, wherein:
one of said plurality of instructions issued by said controller is a 'clrl' command whereby said marker bit of a rightmost of said n-cells in said marked state is set to said non-marked state.

20. The data processing system of claim 1, wherein:
one of said plurality of instructions issued by said controller is a 'left' command whereby all of said marker bits for said n-cells are shifted leftward by one.

21. The data processing system of claim 1, wherein:
one of said plurality of instructions issued by said controller is a 'right' command whereby all of said marker bits for said n-cells are shifted rightward by one.

22. The data processing system of claim 1, wherein:
one of said plurality of instructions issued by said controller is a 'cright' command whereby all of said marker bits for said n-cells that are in said marked state are shifted rightward by one to a next-right cell unless said next-right cell contains a value equal to an argument indicated by said 'cright' command; and
said 'cright' command replaces said data field of said next-right cell with a predetermined value when said next-right cell contains a value equal to an argument indicated by said 'cright' command.

23. The data processing system of claim 1, wherein:
one of said plurality of instructions issued by said controller is a 'cleft' command whereby all of said marker bits for said n-cells that are in said marked state are shifted leftward by one to a next-left cell unless said next-left cell contains a value equal to an argument indicated by said 'cleft command; and
said 'cleft' command replaces said data field of said next-left cell with a predetermined value when said next-left cell contains a value equal to an argument indicated by said 'cleft' command.

24. The data processing system of claim 1, wherein:
one of said plurality of instructions issued by said controller is a 'nop' command whereby no operation is executed.

25. The data processing system of claim 1, wherein:
one of said plurality of instructions issued by said controller is a 'reset' command whereby said data fields of said n-cells are assigned a value indicated by said 'reset' command.

26. The data processing system of claim 1, wherein:
one of said plurality of instructions issued by said controller is a 'get' command whereby a value stored in a leftmost cell of said n-cells in said marked state is outputted from said associative memory device; and
said marker bit of said leftmost cell in said marked state is shifted to the right by one cell.

27. The data processing system of claim 1, wherein:
one of said plurality of instructions issued by said controller is a 'back' command whereby a value stored in a leftmost marked cell is outputted from said associative memory device; and said marker bit of said leftmost marked cell is shifted to the left by one cell.

28. The data processing system of claim 1, wherein:
one of said plurality of instructions issued by said controller is a 'set' command whereby a value indicated by said 'set' command is stored in a leftmost of said n-cells in said marked state.

29. The data processing system of claim 1, wherein:
one of said plurality of instructions issued by said controller is a 'setall' command whereby a value indicated by said 'setall' command is store in all of said n-cells in said marked state.

30. The data processing system of claim 1, wherein:
one of said plurality of instructions issued by said controller is an 'ins' command whereby a value indicated by said 'ins' command is stored in one of said n-cells at an insertion point located prior to a leftmost of said n-cells in said marked state; and
said 'ins' command rightwardly shifts a content of each of said n-cells located to the right of said insertion point by one.

31. The data processing system of claim 1, wherein:
one of said plurality of instructions issued by said controller is a 'del' command whereby a data field of a leftmost of said n-cells in said marked state is deleted; and
said 'del' command leftwardly shifts a content of each of said n-cells located to the right of said leftmost marked cell by one.

32. The data processing system of claim 1, wherein: one of said plurality of instructions issued by said controller is a 'cpr' command whereby contents of all of said n-cells in said marked state are rightwardly copied by one.

33. The data processing system of claim 1, wherein:
one of said plurality of instructions issued by said controller is a 'cpl' command whereby contents of all of said n-cells in said marked state are leftwardly copied by one.

34. The data processing system of claim 1, wherein:
one of said plurality of instructions issued by said controller is a 'ccpr' command whereby contents of all of said n-cells in said marked state are rightwardly copied by one, including copying of said marked state; and
said 'ccpr' command does not copy said marked state of said n-cells whose said contents equals a value indicated by said 'ccpr' command.

35. The data processing system of claim 1, wherein:
one of said plurality of instructions issued by said controller is a 'ccpl' command whereby contents of all of said n-cells in said marked state are leftwardly copied by one, including copying of said marked stale; and
said 'ccpr' command does not copy said marked state of said n-cells whose said contents equals a value indicated by said 'ccpl' command.

36. The data processing system of claim 1, wherein:
one of said plurality of instructions issued by said controller is a 'ld' command whereby a value indicated by said 'ld' command is loaded into said data field in all of said n-cells in said marked state.

37. The data processing system of claim 1, further comprising: a vector memory containing p-vectors; and
one of said plurality of instructions issued by said controller is a 'st' command whereby contents of said data field in all of said n-cells in said marked state are copied to a corresponding location in one of said p-vectors as indicated by said 'st' command.

38. The data processing system of claim 1, wherein:
one of said plurality of instructions issued by said controller is an 'add' command whereby a value indicated by said 'add' command is added to said data field in all of said n-cells in said marked state.

39. The data processing system of claim 1, wherein:
one of said plurality of instructions issued by said controller is a 'fadd' command whereby a value indicated by said 'fadd' command is added to said data field in all of said n-cells in said marked state; and
wherein a leftmost bit of said data field of a cell within said associative memory device positioned to the right of each of said n-cells in said marked state acts as a carry bit.

40. The data processing system of claim 1, wherein:
one of said plurality of instructions issued by said controller is a 'sub' command whereby a value indicated by said 'sub' command is subtracted from said data field in all of said n-cells in said marked state.

41. The data processing system of claim 1, wherein:
one of said plurality of instructions issued by said controller is a 'fsub' command whereby a value indicated by said 'fsub' command is subtracted from said data field in all of said n-cells in said marked state; and
wherein a leftmost bit of said data field of a cell within said associative memory device positioned to the right of each of said n-cells in said marked state acts a carry bit.

42. The data processing system of claim 1, wherein:
one of said plurality of instructions issued by said controller is a 'half' command whereby said data field in all of said n-cells in said marked state is divided by two.

43. The data processing system of claim 1, wherein:
one of said plurality of instructions issued by said controller is an 'fhalf' command whereby said data field in all of said n-cells in said marked state is divided by two; and
wherein 1 is added to a leftmost bit of said data field if a least significant data bit of a cell within said associative memory device positioned to the left of each of said n-cells is in said marked state.

44. The data processing system of claim 1, wherein:
one of said plurality of instructions issued by said controller is a 'lt' command whereby a value indicated by said 'lt' command is compared to said data field in all of said n-cells in said marked state;
said 'lt' command sets said marker bit of said n-cells in said marked state to said non-marked state if said indicated by said 'lt' command is greater than said data field; and
said 'lt' command sets to a 1 a leftmost bit of said data field of said n-cells in said marked state if said value indicated by said 'lt' command is less than said data field.

45. The data processing system of claim 1, wherein:
one of said plurality of instructions issued by said controller is a 'flt' command whereby a value indicated by said 'flt' command is compared to said data field in all of said n-cells in said marked state;
said 'flt' command sets said marker bit of said n-cells in said marked state to said non-marked state if said value indicated by said 'flt' command is greater than said data field and a leftmost bit of said data field of a cell within said associative memory device positioned to the left of each of said n-cells in said marked state is zero;
said 'flt' command sets to 1 a leftmost bit of said data field of said n-cells in said marked state if said value indicated by said 'flt' command is less than said data field;
said 'flt' command sets to 1 a leftmost bit of said data field of said n-cells in said marked state if said leftmost bit of a cell within said associative, memory device positioned to the left of each of said n-cells in said marked state is 1; and
said 'flt' command sets to 0 said leftmost bit of a cell within said associative memory device positioned to the left of each of said n-cells in said marked state.

46. The data processing system of claim 1, wherein:
one of said plurality of instructions issued by said controller is a 'gt' command whereby a value indicated by said 'gt' command is compared to said data field in all of said n-cells in said marked state;
said 'gt' command sets said marker bit of said n-cells in said marked state to said non-marked state if said value indicated by said 'gt' command is less than said data field; and
said 'gt' command sets to 1 a leftmost bit of said data field of said n-cells in said marked state if said value indicated by said 'gt' command is greater than said data field.

47. The data processing system of claim 1, wherein:
one of said plurality of instructions issued by said controller is a 'fgt' command whereby a value indicated by said 'fgt' command is compared to said data field in all of said n-cells in said marked state;
said 'fgt' command sets said marker bit of said n-cells in said marked state to said non-marked state if said value indicated by said 'fgt' command is less than said data field and a leftmost bit of said data field of a cell within said associative memory device positioned to the left of each of said n-cells in said marked state is zero;
said 'fgt' command sets to 1 a leftmost bit of said data field of said n-cells in said marked state if said value indicated by said 'fgt' command is greater than said data field;
said 'fgt' command sets to 1 a leftmost bit of said data field of said n-cells in said marked state if said leftmost bit of a cell within said associative memory device positioned to the left of each of said n-cells in said marked state is 1; and
said 'fgt' command sets to 0 said leftmost bit of a cell within said associative memory device positioned to the left of each of said n-cells in said marked state.

48. The data processing system of claim 1, wherein:
one of said plurality of instructions issued by said controller is a 'test' command whereby for all of said n-cells in said marked state that contain a value indicated by said 'test' command,
said 'test' command sets said marker bit to said non-marked state; and
said 'test' command assigns a predetermined value to said data field of all of said n-cells having said indicated value if a leftmost bit of a cell to the left of all of said n-cells having said indicated value is 1; and
said 'test' command clears a leftmost bit of said cell to the left of all of said n-cells having said indicated value, if said leftmost bit is 1.

49. The data processing system of claim 1, wherein:
one of said plurality of instructions issued by said controller is an 'and' command whereby for all of said n-cells in said marked state, said 'and' command accomplishes a bitwise AND of a value indicated by said 'and' command and said data field in all of said n-cells in said marked state.

50. The data processing system of claim 1, wherein:
one of said plurality of instructions issued by said controller is an 'or' command whereby for all of said n-cells in said marked state, said 'or' command accomplishes a bitwise OR of a value indicated by said 'or' command and said data field in all of said n-cells in said marked state.

51. The data processing system of claim 1, wherein:
one of said plurality of instructions issued by said controller is a 'xor' command whereby for all of said n-cells in said marked state, said 'xor' command accomplishes a bitwise XOR of a value indicated by said 'xor' command and said 'xor' command and said data field in all of said n-cells in said marked state.

52. The data processing system of claim 1, wherein:
one of said plurality of instructions issued by said controller is a 'cond' command whereby for all of said n-cells in said marked state, said 'cond' command switches their marked state to said non-marked state if a result of a bitwise AND operation between a value indicated by said 'cond' command and said data field of all of said n-cells in said marked state is 0.

53. The data processing system of claim 1, wherein:
one of said plurality of instructions issued by said controller is a 'ncond' command whereby for all of said n-cells in said marked state, said 'ncond' command switches their marked state to said non-marked state if a result of a bitwise AND operation between a value indicated by said 'neond' command and said data field of all of said n-cells in said marked state is not 0.

54. The data processing system of claim 48, wherein:
one of said plurality of instructions issued by said controller is an 'index' command whereby for all of said n-cells in said marked state, said 'index' command assigns a value to each of said marked n-cells indicative of each of said marked n-cells position relative to a leftmost of said n-cells.

55. The data processing system of claim 1, wherein:
said classification device determines a global state of each of said n-cells; and
wherein said one of said plurality of instructions is executed by selected cells within said associative memory device in dependence upon both said local state and said global state of said n-cells, said execution of said instruction occurring simultaneously in each of said selected cells within one of said clock cycles.

56. The data processing system of claim 1, wherein:
said associative memory device allows the use of variable-length key fields.

57. The data processing system of claim 56, wherein:
said variable-length key fields include a data field and an attached key field, each of said n-cells having said data field and said attached key field; and
wherein data stored in each of said n-cells is alternatively considered as part of said data field and said attached key field at different times during execution of one of said plurality of instructions.

58. A method of processing data, said method comprising the steps of:
forming an associative memory device to contain n-cells, wherein each of said n-cells include a state field and a data field, said state field comprising a marker bit for encoding a local state of each of said n-cells, thereby indicating one of a marked state and a non-marked state of each of said n-cells;
configuring each of said n-cells to include a processing circuit, the processing circuit performs a plurality of operations;
issuing one of a plurality of instructions from a controller to said associative memory device, the plurality of instructions comprising a 'right limit' command whereby a right limit of a search space is set to a leftmost cell of said n-cells in said marked state;
utilizing a clock device for outputting a synchronizing clock signal comprised of a predetermined number of clock cycles per second, said clock device outputting said synchronizing clock signal to said associative memory device and said controller; and
globally communicating one of said plurality of instructions from said controller to all of said n-cells simultaneously, within one of said clock cycles.

59. A data processing system, said data processing system comprising:
an associative memory device containing n-cells, each of said n-cells including a processing circuit, wherein each of said n-cells include a state field and a data field, said state field comprising a marker bit for encoding a local state of each of said n-cells, thereby indicating one of a marked state and a non-marked state of each of said n-cells;
a controller for issuing one of a plurality of instructions to said associative memory device, the plurality of instructions comprising a 'store line immediate' command whereby the contents of all of said n-cells in said marked state are saved to a memory vector indicated by said 'store line immediate' command;
a clock device for outputting a synchronizing clock signal comprised of a predetermined number of clock cycles per second, said clock device outputting said synchronizing clock signal to said associative memory device and said controller; and
wherein said controller globally communicates one of said plurality of instructions to all of said n-cells simultaneously, within one of said clock cycles.

60. A data processing system, said data processing system comprising:
an associative memory device containing n-cells, each of said n-cells including a processing circuit and m-bits of memory capacity, wherein each of said n-cells include a state field and a data field, said state field comprising a marker bit for encoding a local state of each of said n-cells, thereby indicating one of a marked state and a non-marked state of each of said n-cells;
a controller for issuing one of a plurality of instructions to said associative memory device, the plurality of instructions comprising an 'addmark' command whereby said marker bit of each of said n-cells containing a value equal to an argument indicated by said 'addmark' command is set to said marked state and said 'addmark' command does not affect said marker bit of any other of said n-cells;
a clock device for outputting a synchronizing clock signal comprised of a predetermined number of clock cycles per second, said clock device outputting said synchronizing clock signal to said associative memory device and said controller; and
wherein said controller globally communicates one of said plurality of instructions to all of said n-cells simultaneously, within one of said clock cycles.

* * * * *

UNITED STATES PATENT AND TRADEMARK OFFICE
CERTIFICATE OF CORRECTION

PATENT NO. : 7,383,421 B2  Page 1 of 1
APPLICATION NO. : 10/727811
DATED : June 3, 2008
INVENTOR(S) : Stefan et al.

It is certified that error appears in the above-identified patent and that said Letters Patent is hereby corrected as shown below:

At column 6, line 16, replace "n:" with --in:--

Signed and Sealed this

Nineteenth Day of August, 2008

JON W. DUDAS
*Director of the United States Patent and Trademark Office*